April 3, 1962 W. R. SHAFFER 3,027,647
ROAD STRIPING MACHINE
Filed Oct. 2, 1958 3 Sheets-Sheet 1

INVENTOR
William R. Shaffer
By KARL W. FLOCKS
ATTORNEY

INVENTOR
William R. Shaffer

BY Karl W. Flocks
ATTORNEY

April 3, 1962 W. R. SHAFFER 3,027,647
ROAD STRIPING MACHINE
Filed Oct. 2, 1958 3 Sheets-Sheet 3
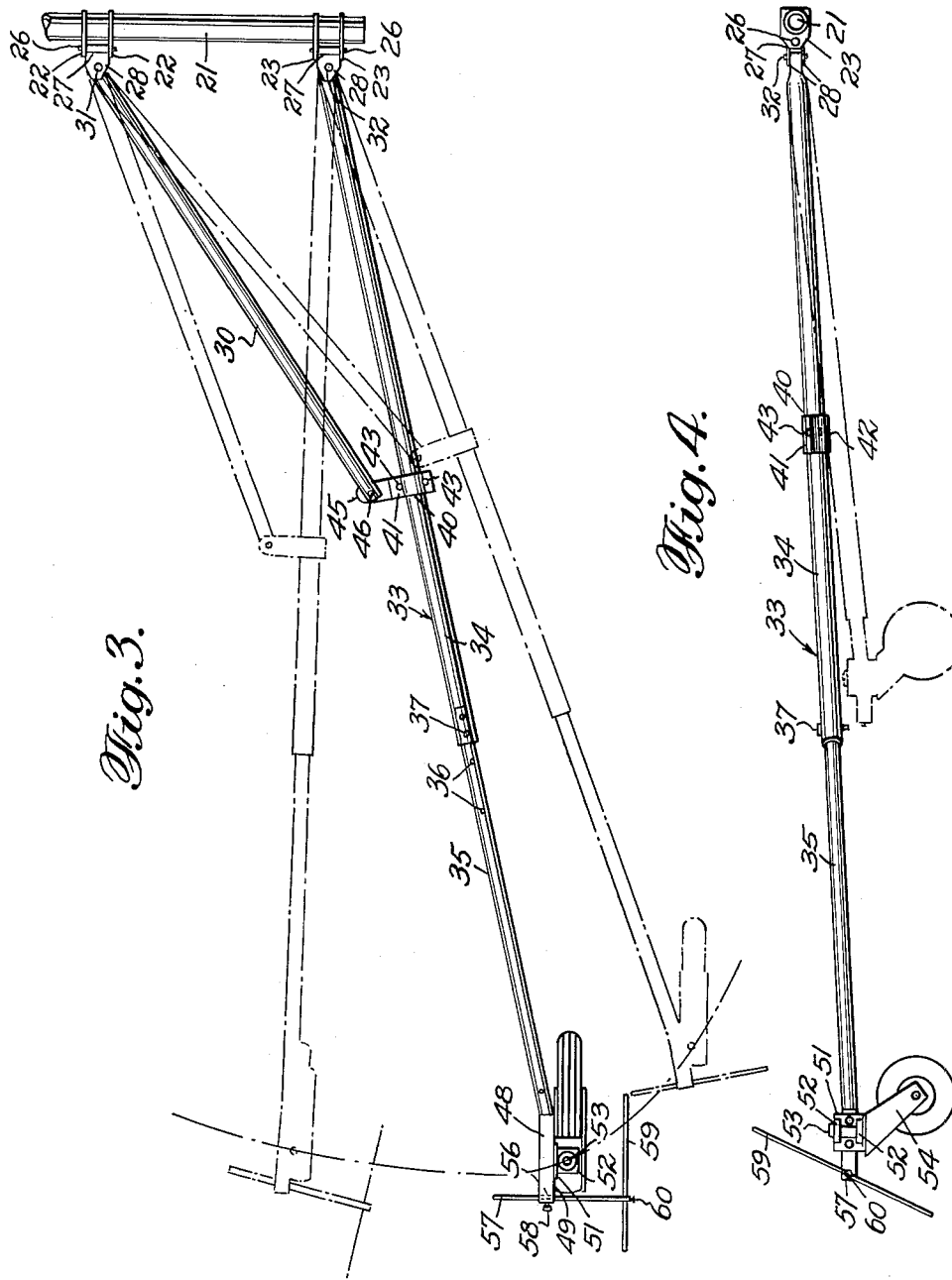
INVENTOR
William R. Shaffer
BY Karl W. Flocks
ATTORNEY United States Patent Office 3,027,647
Patented Apr. 3, 1962

3,027,647
ROAD STRIPING MACHINE
William R. Shaffer, Huntingdon, Pa., assignor to Wald Industries, Inc., Huntingdon, Pa., a corporation of Pennsylvania
Filed Oct. 2, 1958, Ser. No. 764,811
6 Claims. (Cl. 33—46)

The present invention relates to a road striping machine, and more particularly to a pointer for such a machine, said pointer being laterally adjustable and movable from right-hand to left-hand operating positions.

Equipment for placing a strip or plurality of strips of paint along the center line or the sides of roads has been used for many years, and in its present form usually comprises a truck on which is mounted a supply of paint, spray guns supported by the truck and in proper position relative to the road, and a pointer extending forwardly of the truck to serve as a guide to the driver of the truck. Thus, by using the pointer as a guide the operator of the truck is able to effect the spraying of the paint onto the proper part of the road.

Prior known pointers have usually been mounted on the front of the truck and could be pivoted upwardly to a position in which they could be carried during transport, the pointer in the transport position usually being substantially vertical. When placed in the operative position, the pointer had only one position, and thus each operator of the truck had to establish for himself how to sight on the pointer to obtain the desired position of the line sprayed.

Of relatively recent widespread use is the highway side marker line, this usually being a single interrupted stripe placed at the right hand edge of the roadway surfacing material, thus serving as an indicator of the boundary between the paved surface and the unpaved shoulder of the road. As road striping equipment is usually mounted on the left-hand side of the truck, for obvious reasons, the mounting of spray equipment on the right-hand side of the truck was introduced. However, there has not heretofore been provided a pointer for use with equipment for spraying the stripe at the right-hand side of the road.

An object of the present invention is to provide a pointer for a road striping machine that is adjustable to suit the requirements of individual operators of the machine.

Another object of the present invention is the provision of a pointer for a road striping machine that is adjustable to suit the requirements of varied striping operations.

A further object of the present invention is to provide a pointer that is adjustable laterally of the road striping machine.

Still another object of the present invention is the provision for a pointer for a road striping machine that is adjustable so as to locate the guide marker closer to or further from the operator of the machine.

A still further object of the present invention is to provide a pointer that is readily adjustable both laterally of the road striping machine and in which the pointer guide may be readily adjusted relative to the operator.

Another object of the present invention is the provision of a pointer for a road striping machine that may be used for either left-hand or right-hand operation of the spray equipment.

A still further object of the present invention is to provide a pointer that can be readily shifted between right-hand and left-hand operating positions by one man using only simple hand tools.

Other objects and the nature and advantages of the instant invention will be apparent from the following description taken in conjunction with the accompanying drawings, wherein:

FIG. 3 is a partial plan view of the pointer in accordance with the present invention in several positions thereof.

FIG. 4 is a partial elevational view showing the pointer in several positions.

Figure 1:
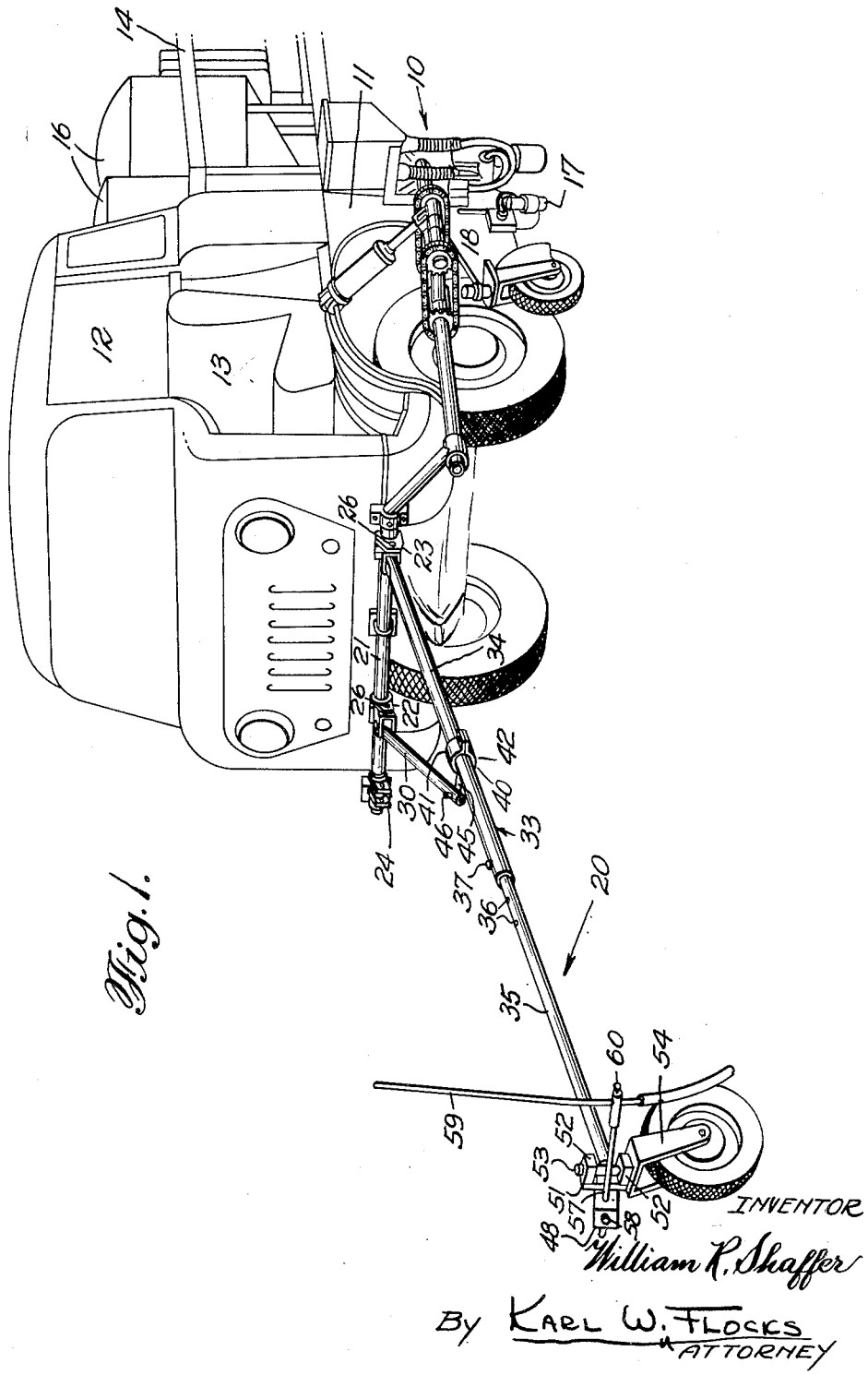
FIG. 1 is a perspective view of a road striping machine having a pointer in accordance with the present invention extending therefrom.

Referring now to the drawings, wherein like reference numerals are used to designate like or corresponding parts throughout the several views, there is shown in FIG. 1 a road striping machine 10 comprising a truck 11 having a cab 12 with a seat 13 for the operator. The truck 11 has a body 14 that supports the usual containers 16 for paint and other materials. A conventional paint supply system may be used to furnish paint to the spray gun 17 mounted on the carriage 18 shown at the left side of the truck 11 and generally in line with the operator's seat 13.

Figure 2:
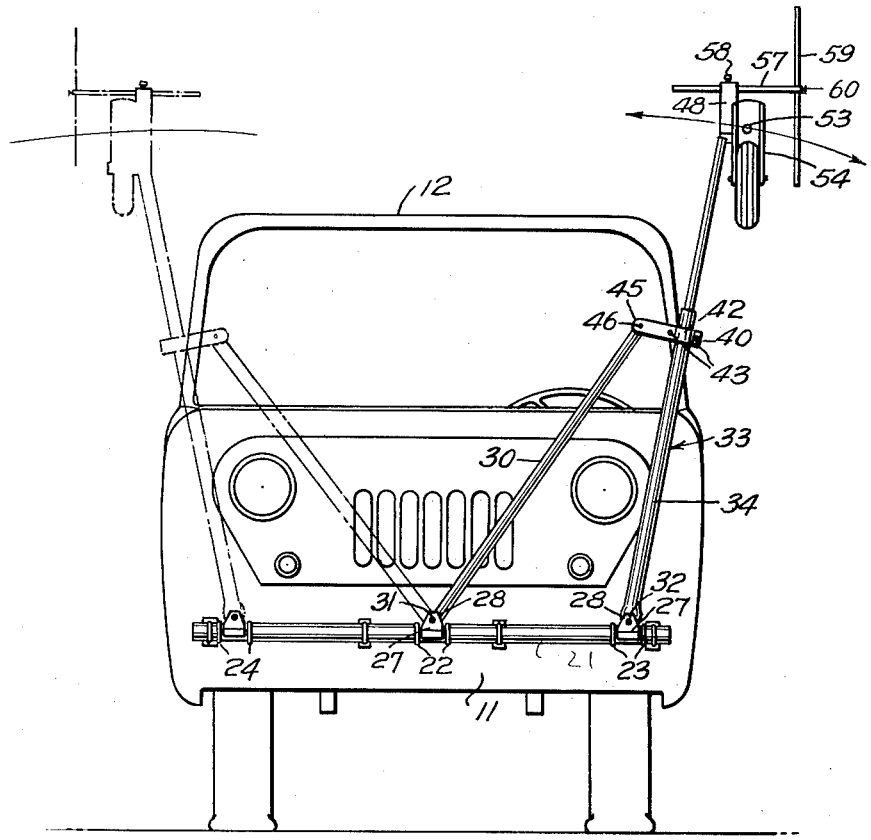
FIG. 2 is a front view of the road striping machine shown in FIG. 1 and showing the pointer raised to travel position.

A pointer 20 extends forwardly of the truck 11 and is carried on a support bar 21 extending transversely of the front of the truck 11. As may be seen in FIG. 2, support bar 21 has a pair of spaced ears 22 secured thereto, as by welding, approximately at the center thereof, and as may be seen in FIG. 3 these ears 22 extend forwardly of support bar 21. Another pair of forwardly extending spaced ears 23 is secured to the support bar adjacent the left end thereof and a third and similar pair of ears 24 is secured to the support bar 21 adjacent the right end thereof.

Each of the aforesaid pair of ears carries a spindle 26, and the spindles 26 are in substantially parallel relationship with the support bar 21. Brackets 27 are shown journaled on the spindles 26 of the left-hand and center ears 23 and 22, respectively, and each of the brackets 26 has, as may be seen in FIG. 4, a pair of vertically spaced forwardly extending plates 28.

A tubular bar comprising a brace 30 has the rear end thereof positioned between the plates 28 of the central bracket 27 and is pivotally connected thereto by a vertically extending pin 31. Between the plates 28 of the left-hand bracket 27 there is pivotally secured by a vertically extending pin 32 the rear end of a tubular arm 33. Tubular arm 33 is telescopic, and comprises tubular member 34 that telescopically receives therein the smaller tubular member 35, tubular member 35 being the forward member and tubular member 34 being the rear member. Tubular member 35 has a plurality of spaced holes 36 that may each be aligned with a hole in the outer end of rear tubular member 34, and a bolt 37 through the aligned holes serves to hold the members 34 and 35 in any one of several positions.

Secured on the rear tubular member 34 is a clamp 40 comprising an upper plate 41 and a lower plate 42, these plates being semi-circular in their mid portions so as to embracingly engage with the tubular member 34. These plates 41 and 42 are secured to the tubular member 34 by bolts 43 extending therethrough and having nuts on their lower ends. The lower plate 42 of the clamp 40 has an outstanding ear 45, and the forward end of the brace 30 is secured to the ear 45 by the vertically extending pin 46.

At the forward end of tubular member 35 of the arm 33 is secured a block 48, the axis of which is at an angle to the axis of arm 33 and the outer side 49 of which is generally planular. A bracket 51 is secured to the outer face 49 of block 48, and has two parallel, generally horizontally extending ears 52, the ears 52 pivotally receiving the vertically extending spindle 53 of a road engaging caster wheel 54.

The forward end of block 48 has a generally horizontal hole 56 therethrough, and a rod 57 extends through the hole 56 and is held therein by a set screw 58. The rod 57 has a hole transversely of the axis thereof and adjacent one end thereof, and a pin 59 extends through the hole in rod 57 and is held therein by an axially extending set screw 60 that extends into the end of the rod and engages the pin 59.

In operation, the pointer 20 lies in the position generally shown in FIG. 1 and serves to support the pin 59 at the forward end thereof, the pointer 20 being supported by the caster wheel 54 and the support bar 21. In order to adjust the position of the pin 59, it will be understood that minor adjustments may be made therein by means of the set screw 58. However, for major adjustments of the position of pin 59, to suit the needs of an individual operator and/or of an individual sighting operation, the nuts on bolts 43 of clamp 40 are loosened and the clamp 40 may then be slid either forwardly or rearwardly along the tubular member 34 to move the front end of pointer 20 to the right or left, respectively. Thus, pointer 20 may be moved, for instance, as is shown in FIG. 3 to the right-hand or upper dotted line position by moving clamp 40 forwardly, and may be moved to the left-hand or lower dotted line position by moving clamp 40 rearwardly. As will be understood, there will be horizontal movement of the brace 30 and arm 33 and this horizontal movement of these parts is permitted by the vertically extending pins 31, 32 and 46.

As may be seen in FIG. 4, the forward end of pointer 20 may be moved toward or from the operator seated in the seat 13 by simply removing the bolt 37 and telescopically adjusting the forward tubular member 35 in the rear tubular member 34 and then reinserting the bolt 37 in aligned holes in these two members.

With the above described lateral and longitudinal adjustment of the forward end of the pointer 20, the pin 59 may be readily and rapidly adjusted in any desired position on the left side of the machine 10, although it will be understood that the front end of the pointer 20 can be made to extend to and possibly beyond the center line of the machine 10.

In order to shift the pointer 20 from left-hand operation to right-hand operation it is merely necessary to perform a few simple steps with ordinary tools. Thus, to change to the right-hand position, one would first loosen set screw 58 and remove the rod 57 from the block 48. Then the bolt 37 is removed, the tubular members 34 and 35 separated and the caster wheel 54 removed from the bracket 51. Pin 46 is removed from the ear 45 of clamp 40 and spindle 26 is withdrawn from the ears 23 so as to release bracket 27. Bracket 27 is then secured between the ears 24 at the right-hand end of support bar 21 by the spindle 26 thereof. Then the nuts 44 are loosened and clamp 40 turned 180° so that ear 45 extends inwardly and then pin 46 used to reconnect the brace 30 with clamp 40. Forward tubular member 35 is then reinserted into rear tubular member 34, with the face 49 of block 48 on the outer or right-hand side, and the bolt 37 placed into aligned holes in the tubular members 34 and 35. Thereafter, the spindle 53 of caster wheel 54 is reinserted into the ears 52 of bracket 51 and finally the rod 57 is reinserted into the hole in block 48.

Figure 5:
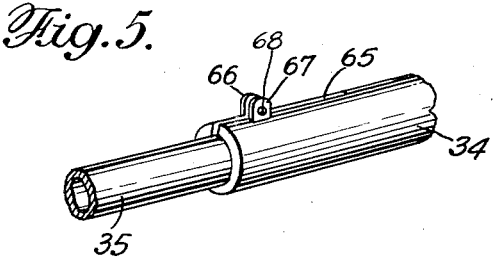
FIG. 5 is a perspective view of a modified embodiment of a part of the pointer.

In the construction shown in FIG. 5, tubular member 34 has a longitudinally extending slot 65 therein, and upstanding pierced ears 66 and 67 thereon on either side of slot 65. A bolt and nut assembly 68 passes through the ears 66 and 67, and the assembly 68 may be tightened or loosened to hold or release the smaller tubular member 35.

Figure 6:
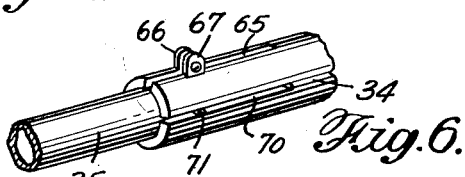
FIG. 6 is a perspective view of a further modified embodiment of a part of the pointer.

The construction of the parts shown in FIG. 6 is the same as that in FIG. 5, but there has been provided a stabilizer comprising a slot 70 in the tubular member 34 and an outwardly extending pin 71 on the smaller tubular member 35 engagingly received by the slot 70. This construction assures an irrotational connection of the members 34 and 35.

The constructions of FIGS. 5 and 6 permit axial adjustment of the members 34 and 35, and the ready shifting of the pointer from left-hand operation to right-hand operation. In addition the slot 70 and pin 71 shown in FIG. 6 give added stability to the member 35.

There has been provided a road striping machine having a pointer that is so constructed that the front end thereof may be adjusted both laterally and longitudinally to enable a guide pin carried by the front of the pointer to be positioned in any of a large number of positions forwardly of the striping machine. In addition, the above described pointer is readily movable from left-hand operating position to right-hand operating position and back by the use of only simple readily available hand tools.

It will be obvious to those skilled in the art that various changes may be made without departing from the spirit of the invention and therefore the invention is not limited to what is shown in the drawings and described in the specification but only as indicated in the appended claims.

What is claimed is:

1. In a road striping machine having a support bar extending transversely of the front thereof, a first pair of ears secured to said support bar approximately at the center thereof and extending forwardly, a second pair of forwardly extending spaced ears secured to said support bar adjacent one end thereof, a spindle carried by each pair of ears substantially parallel with said support bar, a bracket journaled on each of said spindles and having a pair of vertically spaced plates extending therefrom, a brace having one end between the plates of the central bracket and pivotally connected thereto by a vertically extending pin, a tubular arm having one end between the plates of the end bracket and pivotally connected thereto by a vertically extending pin, said tubular arm comprising front and rear telescopic tubular members, an adjustable clamp having an outstanding ear secured on said rear tubular member and having the other end of said brace secured to the ear thereof by a vertically extending pin, said tubular arm having a block on the other end thereof, a vertical bracket with horizontal ears secured to said block, a road engaging caster wheel having a vertically extending spindle journaled in said last mentioned ears, a generally horizontal hole through said block, a rod extending through said hole and held therein by a set screw, a hole in said rod transversely of the axis thereof and adjacent one end thereof, a pin extending through said last mentioned hole, and an axially extending set screw extending into said end of said rod and engaging said pin.

2. In a road striping machine having a support bar extending transversely of the front thereof, a first pair of spaced ears secured to said support bar approximately at the center thereof and extending forwardly, a second pair of forwardly extending spaced ears secured to said support bar adjacent one end thereof, a spindle carried by each pair of ears substantially parallel with said support bar, a bracket journaled on each of said spindles and having a pair of vertically spaced plates extending therefrom, a brace having one end between the plates of the central bracket and pivotally connected thereto by a vertically extending pin, a tubular arm having one end between the plates of the end bracket and pivotally connected thereto by a vertically extending pin, said tubular arm comprising front and rear telescopic tubular members, an adjustable clamp having an outstanding ear secured on said rear tubular member and having the other end of said brace secured to the ear thereof by a vertically extending pin, said tubular arm having a block on the other end thereof, a vertical bracket with horizontal ears secured to said block, a road engaging caster wheel having a vertically extending spindle journaled in said last mentioned ears, and a guide pin adjustably supported from said block.

3. In a road striping machine having a support bar extending transversely of the front thereof, a pair of brackets, means horizontally pivotally securing said brackets to said support bar, one approximately at the center thereof and extending forwardly and the other adjacent one end thereof and also extending forwardly, said brackets each having a pair of vertically spaced plates extending therefrom, a brace having one end between the plates of the central bracket and pivotally connected thereto by a vertically extending pin, a tubular arm having one end between the plates of the end bracket and pivotally connected thereto by a vertically extending pin, said tubular arm comprising front and rear telescopic tubular members, an adjustable clamp having an outstanding ear secured on said rear tubular member and having the other end of said brace secured to the ear thereof by a vertically extending pin, said tubular arm having a block on the other end thereof, a vertical bracket with horizontal ears secured to said block, a road engaging caster wheel having a vertically extending spindle journaled in said last mentioned ears, and a guide pin adjustably supported from said block.

4. In a road striping machine having a support bar extending transversely of the front thereof, a pair of brackets, means horizontally pivotally securing said brackets to said support bar, one approximately at the center thereof and extending forwardly and the other adjacent one end thereof and also extending forwardly, a brace, means vertically pivotally connecting one end thereof to the central bracket, a tubular arm, means vertically pivotally connecting one end thereof to the end bracket, said tubular arm comprising front and rear telescopic tubular members, an adjustable clamp having an outstanding ear secured on said rear tubular member and having the other end of said brace secured to the ear thereof by a vertically extending pin, said tubular arm having a block on the other end thereof, a vertical bracket with horizontal ears secured to said block, a road engaging caster wheel having a vertically extending spindle journaled in said last mentioned ears, and a guide pin adjustably supported from said block.

5. In a road striping machine, a brace having an inner end horizontally pivotally secured to the front of the machine approximately at the center thereof, an arm having an inner end horizontally pivotally secured to the front of the machine adjacent a side thereof, means for adjustably securing the outer end of said brace to said arm intermediate the ends thereof, a caster wheel rotatably and swively secured to the outer end of said arm, a guide pin adjustably supported on the outer end of said arm, a block on the outer end of said arm having a generally horizontal hole therethrough, a rod extending through the hole in said block, a set screw holding said rod in the hole in said block, said rod having a hole therein transversely of the axis thereof and adjacent one end thereof, said guide pin extending through the hole in said rod, and an axially extending set screw extending into the end of said rod and engaging said guide pin.

6. In a road striping machine having a support bar extending transversely of the front thereof, a first pair of spaced ears secured to said support bar approximately at the center thereof and extending forwardly, second and third pairs of forwardly extending spaced ears secured to said support bar adjacent opposite ends thereof, a removable spindle carried by the central and one end pair of ears substantially parallel with said support bar, a bracket journaled on each of said spindles and having a pair of vertically spaced plates extending therefrom, a brace having one end between the plates of the central bracket and pivotally connected thereto by a vertically extending pin, a tubular arm having one end between the plates of the end bracket and pivotally connected thereto by a vertically extending pin, said tubular arm comprising front and rear telescopic tubular members, an adjustable clamp having an outstanding ear secured on said rear tubular member and having the other end of said brace secured to the ear thereof by a vertically extending pin, said tubular arm having a block on the other end thereof, a vertical bracket with horizontal ears secured to said block, a road engaging caster wheel having a vertically extending spindle removably journaled in said last mentioned ears, a generally horizontal hole through said block, a rod extending through said hole and held therein by a set screw, a hole in said rod transversely of the axis thereof and adjacent one end thereof, a pin extending through said last mentioned hole, and an axially extending set screw extending into said end of said rod and engaging said pin, whereby said guide pin may be supported forwardly of either the left or right side of said machine by connecting said arm to one or the other of said end pair of ears.

References Cited in the file of this patent

UNITED STATES PATENTS

| | | |
|---|---|---|
| 637,939 | Murray | Nov. 28, 1899 |
| 841,794 | Line | Jan. 22, 1907 |
| 1,230,084 | Strack | June 12, 1907 |
| 1,019,199 | Sutton | Mar. 5, 1912 |
| 1,021,021 | Vivvert | Mar. 26, 1912 |
| 1,634,421 | Hedrick | July 5, 1927 |
| 1,888,502 | Holstein | Nov. 22, 1932 |

FOREIGN PATENTS

| | | |
|---|---|---|
| 18,610 | Great Britain | 1892 |
| 19,943 | Great Britain | 1894 |

OTHER REFERENCES

Publication: Popular Science, September 1951, page 114.